United States Patent
Wang (10) Patent No.: US 11,847,673 B2
(45) Date of Patent: Dec. 19, 2023

(54) SUBSCRIPTION SERVICE PLATFORMS UTILIZING DYNAMIC BUNDLING MECHANISMS

(71) Applicant: Sophie M Wang, Los Altos, CA (US)

(72) Inventor: Sophie M Wang, Los Altos, CA (US)

(*) Notice: Subject to any disclaimer, the term of this patent is extended or adjusted under 35 U.S.C. 154(b) by 0 days.

(21) Appl. No.: 17/456,369

(22) Filed: Nov. 23, 2021

(65) Prior Publication Data

US 2022/0164838 A1    May 26, 2022

Related U.S. Application Data (60) Provisional application No. 63/117,088, filed on Nov. 23, 2020.

(51) Int. Cl.
*G06Q 30/00* (2023.01)
*G06Q 30/0601* (2023.01)

(52) U.S. Cl.
CPC .............. *G06Q 30/0601* (2013.01)

(58) Field of Classification Search
CPC ............................... G06Q 30/06–08
See application file for complete search history.

(56) References Cited

U.S. PATENT DOCUMENTS

| 10,354,239 B1* | 7/2019 | Nguyen | G06Q 30/0641 |
| 11,423,373 B1* | 8/2022 | Book | G06Q 20/40 |
| 2016/0241676 A1* | 8/2016 | Armstrong | G06F 16/24568 |

\* cited by examiner

*Primary Examiner* — Ethan D Civan
(74) *Attorney, Agent, or Firm* — MagStone Law, LLP; Enshan Hong (57) ABSTRACT

In accordance with some embodiments of the present disclosure, dynamic bundling mechanisms are provided. The dynamic bundling mechanisms may enable dynamic reconfiguration of a subscription bundle. The dynamic bundling mechanisms may include receiving a user request for generating a subscription bundle, identifying one or more first subscription services in view of the user request, generating the subscription bundle based on the one or more first subscription services, detecting interactions with the one or more first subscription service by the first user, receiving a user request for reconfiguring the subscription bundle, and reconfiguring the subscription bundle in view of at least first user's interaction with the first subscription services or the user request for reconfiguring the subscription bundle.

20 Claims, 5 Drawing Sheets

SUBSCRIPTION SERVICE PLATFORMS UTILIZING DYNAMIC BUNDLING MECHANISMS

CROSS REFERENCE TO RELATED APPLICATION

This application claims the benefit of U.S. Provisional Patent Application No. 63/117,088, filed Nov. 23, 2020, which is hereby incorporated by reference herein in its entirety.

TECHNICAL FIELD

The implementations of the disclosure relate generally to computer systems, and, more specifically, to subscription service platforms utilizing dynamic bundling mechanisms.

BACKGROUND

Many businesses offer products and services on a subscription basis. For example, prior solutions for providing subscription-based services may allow a customer to pay a recurring price at regular intervals for access to a collection of products, services, or media content. However, the subscription-based services are typically associated with a fixed subscription bundle with strict terms. For example, the customer may have to be locked down with the fixed subscription bundle and cannot make changes to the bundle during the subscript term without paying a penalty. However, the customer may want to change the subscription bundle from time to time during the subscription period.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

According to one or more aspects of the present disclosure, methods for providing dynamic bundling are provided. The methods may include receiving, from a computing device of a first user, a user request for generating a subscription bundle; identifying one or more first subscription services in view of the user request; generating the subscription bundle based on the one or more first subscription services; detecting interactions with the one or more first subscription services by the first user; and reconfiguring the subscription bundle based in view of the interactions with the first subscription services by the first user.

In some embodiments, the methods further include: reconfiguring the subscription bundle in view of a user request for reconfiguring the subscription bundle, wherein the user request for reconfiguring the subscription bundle comprises at least one of a request for unsubscribing from one or more of the first subscription services or a request for adding one or more subscription services to the subscription bundle.

In some embodiments, the user request for generating the subscription bundle comprises information about one or more subscription services to be associated with the subscription bundle.

In some embodiments, the information is about one or more types of subscription services to be associated with the subscription bundle.

In some embodiments, the user request for generating the subscription bundle comprises the number of subscription services to be associated with the subscription bundle.

In some embodiments, the user request for generating the subscription bundle comprises one or more attributes of subscription services in which the user is interested, and wherein identifying one or more first subscription services in view of the user request is based on one or more attributes of subscription services in which the user is interested.

In some embodiments, generating the subscription bundle based on the one or more first subscription services comprises: storing at least one of data about the one or more first subscription services, the subscription term, or information related to the one or more subscription services in association with an identifier of a user account of the user.

In some embodiments, reconfiguring the subscription bundle comprises disassociating one or more of the first subscription services from the subscription bundle and associating one or more second subscription services with the bundle service.

In some embodiments, the methods further include detecting an indication that the subscription bundle is to be reconfigured within a subscription term associated with the subscription bundle; identifying a first subscription service to be modified based on the indication; determining whether the first subscription service can be modified; and performing an operation based on the determination, where the operation comprises at least one of: replacing the first subscription service with a second subscription service in response to determining that the first subscription service can be modified; or generating a message indicative of the determination that the first subscription service cannot be modified in response to determining that the first subscription service cannot be modified.

In some embodiments, detecting the indication comprises receiving a user request for unsubscribing from one or more subscription services included in the subscription bundle within the subscription term.

In some embodiments, detecting the indication comprises detecting interactions with the subscription services included in the bundle service by the first user and determining that the interactions do not satisfy one or more predetermined computer-implemented rules.

In some embodiments, determining whether the first subscription service can be modified comprises: determining whether one or more subscription limits applicable to the first subscription are satisfied.

In some embodiments, the one or more subscription limits comprise at least one of a minimum subscription period that defines the minimum time period during which a user is to be subscribed to the subscription service, a threshold number of times a given subscription service may be unsubscribed during the subscription term.

In some embodiments, replacing the first subscription service with a second subscription service includes: disassociating the first subscription service from the subscription bundle and associating the second subscription service with the subscription bundle.

In some embodiments, replacing the first subscription service with a second subscription service further includes granting the user access to the second subscription service.

In some embodiments, the methods further include providing a user device of the user with data for presenting the information about candidate subscription services via one or more user interfaces.

According to one or more aspects of the present disclosure, a system is provided. The system includes: a memory; and a processing device communicably coupled to the memory, the processing device to execute instructions to: receive, from a computing device of a first user, a user request for generating a subscription bundle; identify one or more first subscription services in view of the user request; generate the subscription bundle based on the one or more first subscription services; detect interactions with the one or more first subscription services by the first user; and reconfigure the subscription bundle based in view of the interactions with the first subscription services by the first user.

According to one or more aspects of the present disclosure, a non-transitory machine-readable storage medium is provided. The non-transitory machine-readable storage medium stress instructions which, when executed, cause a processing device to: receive, from a computing device of a first user, a user request for generating a subscription bundle; identify one or more first subscription services in view of the user request; generate the subscription bundle based on the one or more first subscription services; detect interactions with the one or more first subscription services by the first user; and reconfigure the subscription bundle based in view of the interactions with the first subscription services by the first user.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding.

DETAILED DESCRIPTION

Aspects of the present disclosure provide for subscription service platforms utilizing dynamic bundling mechanisms.

Many businesses offer products and services on a subscription basis. For example, prior solutions for providing subscription-based services may allow a customer to pay a recurring price at regular intervals for access to a collection of products, services, or media content. However, the subscription-based services are typically associated with a fixed subscription bundle with strict terms. For example, the customer may have to be locked down with the fixed subscription bundle and cannot make changes to the bundle during the subscript term without paying a penalty.

The present disclosure provides for dynamic bundling mechanisms that may solve the aforementioned and other deficiencies of the prior solutions. The dynamic bundling mechanisms may enable dynamic reconfiguration of a subscription bundle. For example, the dynamic bundling mechanisms may generate a subscription bundle of television programs for a first user. The subscription bundle may include a certain number of television programs, such as channel A, channel B, and channel C. The subscription bundle may be associated with a predetermined subscription term (e.g., a year) that defines a period of time during which the subscription bundle is effective. The first user may be charged a fixed amount for the subscription bundle with the subscription term.

During the subscription term, the dynamic bundling mechanisms may dynamically reconfigure the subscription bundle based on the first user's interactions with the television programs and/or the first user's request for reconfiguring the first bundle service. For example, the dynamic bundling mechanisms may receive a user request for replacing one or more of the television programs included in the subscription bundle (e.g., replacing channel A with channel D). The dynamic bundling mechanisms may then reconfigure the subscription bundle based on the user request. As another example, the dynamic bundling mechanisms may detect the first user's interactions with the television programs and may dynamically reconfigure the subscription bundle accordingly. More particularly, for example, the dynamic bundling mechanisms may detect that the first user has not consumed content related to channel A for a predetermined period of time or that a rating of channel A provided by the first user is lower than a threshold rating. The dynamic bundling mechanisms may then dynamically reconfigure the subscription bundle by replacing channel A with another television program that might interest the first user. In some embodiments, the dynamic bundling mechanisms may identify one or more other television programs that might interest the first user based on quality, relevancy, and other matching criteria.

Accordingly, the dynamic bundling mechanisms provide the first user with subscription services that are dynamically configured during the subscription term based on the first user's interactions with the subscription services, while the first user is charged for a one-time subscription fee. The dynamic bundling mechanisms micro-payment may also enable more fine-grain consumption of producers' work (e.g., products, services, content). As such, the dynamic bundling mechanisms are an incentive mechanism design that promotes consumption and liquidity, which results in a virtuous cycle: high-quality content gets more consumption, consumers have better return on investment from its content subscription, and the platform benefits from its increased volume, engagement, and revenue. For a platform providing subscription services, the dynamic bundling mechanisms disclosed herein may allow better platform liquidity. With appropriate economics and incentive mechanism design, for example, various fees for subscription term agility which is core to dynamic bundling, the platform increases its revenue potential and its user base stickiness.

Figure 1:
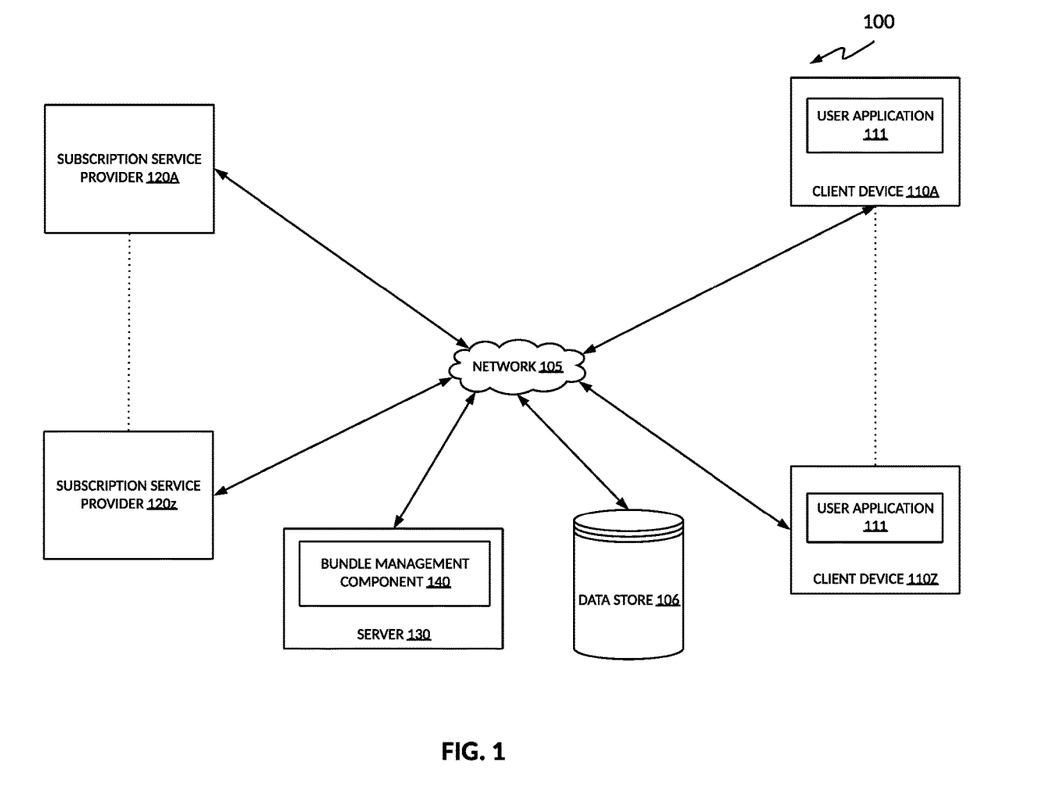
FIG. 1 illustrates an example of a system architecture for providing dynamic bundling in accordance with the embodiments of the present disclosure.

FIG. 1 illustrates an example of a system architecture 100 for providing dynamic bundling in accordance with the embodiments of the present disclosure. The system architecture 100 includes client devices 110A through 110Z, a network 105, a data store 106, subscription service providers 120A through 120Z, and a server 130. In one implementation, network 105 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. In one implementation, the data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers). The data store 106 may store data and/or information about subscription services, subscription bundles, etc. to implement the embodiments of the present disclosure.

The client devices 110A through 110Z may each include computing devices such as personal computers (PCs), laptops, mobile phones, tablet computers, netbook computers, etc. In some implementations, client devices 110A through 110Z may also be referred to as "user devices." Each client device may include a user app 111. In one implementation, the user apps 111 may be applications that can provide dynamic bundling functions for users of the client devices 110A through 110Z. The user app 111 may enable users to view content, such as images, videos, web pages, documents, etc. For example, the user app 111 may be a web browser that can access, retrieve, present, and/or navigate content (e.g., web pages such as Hyper Text Markup Language (HTML) pages, digital media items, etc.) served by a web server. The user app 111 may render, display, and/or present the content (e.g., a web page, video content, audio content, text, etc.) to a user. The user app 111 may also display an embedded media player (e.g., a Flash® player or an HTML5 player) that is embedded in a web page (e.g., a web page that may provide information about a product sold by an online merchant). In another example, the user app 111 may be a standalone application that allows users to view digital media items (e.g., digital videos, digital images, electronic books, etc.). The user apps 111 may be provided to the client devices 110A through 110Z by the server 130. For example, the user apps 111 may be embedded media players that are embedded in web pages provided by the server 130. In another example, the user apps 111 may be applications that are downloaded from the server 130.

Each of the subscription service providers 120A-120Z may include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components for providing subscription services. The subscription services may relate to any suitable products, services, media content, etc. that may be provided on a subscription basis, such as media streaming services, television programs, news, articles, magazines, books, newsletters, audiobooks, clothing, toys, games, mobile apps, computer software, cosmetics, etc. A given subscription service may correspond to a particular type of products, services, and/or media content, such as a particular television program (e.g., a television channel), media content created by a particular content creator (e.g., newsletters or articles created by the content creator), streaming services provided by a particular content streaming platform, etc.

As an example, one or more of the subscription service providers 120A-120Z may include a content delivery platform that can provide a user with access to content items and/or provide the content items to the user. For example, the content delivery platform may allow a user to consume, upload, search for, approve of ("like"), dislike, and/or comment on content items. The content delivery platform may also include a website (e.g., a web page) that may be used to provide a user with access to the media items. The content delivery platform may include any type of content delivery network providing access to content and/or media items.

Examples of a content item can include, and are not limited to, digital video, digital movies, digital photos, digital music, website content, social media updates, electronic books (ebooks), electronic magazines, digital newspapers, digital audio books, electronic journals, web blogs, real simple syndication (RSS) feeds, electronic comic books, software applications, etc. A content item may be consumed via the Internet and/or via a mobile device application. For brevity and simplicity, an online video (also hereinafter referred to as a video) is used as an example of a content item throughout this document. As used herein, "media," "media item," "online media item," "digital media," "digital media item," "content," and "content item" can include an electronic file that can be executed or loaded using software, firmware, or hardware configured to present the digital content item to an entity.

In some embodiments, one or more of the subscription service providers 120A-120Z may include a client device of a user that can create content, products, services, etc. to be provided as subscription services (e.g., a writer, journalist, artist, publisher, or any other content creator).

The server 130 may be and/or include one or more computing devices (e.g., a rackmount server, a server computer, etc.) for providing dynamic bundling in accordance with the present disclosure. In some embodiments, the server 130 may be part of a platform that provides subscription bundles. In some embodiments, the server 130 may be part of one or more of the subscription service providers 120. The server 130 may include a bundle management component 140. The bundle management component 140 and the user app 111 may operate together to provide dynamic subscription bundling for the client device 110A-110Z.

The bundle management component 140 may provide and manage dynamic subscription bundles for users of the client device 110A-110Z. Each of the dynamic subscription bundles may include subscriptions to one or more subscription services. Each of the dynamic subscription bundles may include a certain number of subscription services (e.g., ten television programs). Each of the dynamic subscription bundles may be associated with a subscription term that defines a period of time during which the dynamic subscription bundle is effective. The users are charged for a respective subscription bundle on a recurring basis instead of a one-time basis. During the subscription term, the bundle management component 140 may manage and reconfigure the subscription services included in the dynamic subscription bundle in a dynamic manner.

As an example, the bundle management component 140 may generate a first subscription bundle for a first user. The first subscription bundle may be associated with a first subscription term (e.g., a week, a month, a year, or any other suitable period of time) and may include subscriptions to a certain number of one or more types of subscription services (e.g., ten television channels, three magazines and newspapers, five newsletters). The first user may be charged for the first subscription bundle during the subscription term for a predetermined price. As a more particular example, the bundle management component 140 may include one or more first subscription services (e.g., a few television channels, such as channel A, channel B, and channel C). Upon generating the first subscription bundle, the bundle management component 140 may grant the first user access to the one or more first subscription services.

In some embodiments, the bundle management component 140 and/or the user app 111 may gather information about the first user's interactions with the one or more first subscription services and may dynamically reconfigure the first subscription bundle based on the gathered information. Examples of user interactions with a subscription service may include interactions with content provided by the subscription service, purchasing the products and/or services provided by the subscription service, using services provided by the subscription service (e.g., using software as a service (SaaS) provided by the subscription service), providing a rating and/or review with respect to the subscription service, etc. The interactions with the content provided by the subscription service may include, for example, consuming the content, sharing the content on a content sharing platform, providing a comment in association with the content on a social network, liking the content associated with the subscription service, etc.

To reconfigure the first subscription bundle, the bundle management component 140 may replace one or more of the first subscription services with one or more other subscription services (also referred to as the "second subscription services"). For example, the bundle management component 140 may determine that the first user's interactions with channel A do not satisfy a predetermined rule based on the gathered information (e.g., by determining that the first user has not consumed content related to channel A for a predetermined period of time or that a rating of the subscription service provided by the first user is lower than a threshold rating). The bundle management component 140 may replace channel A with another television channel in view of the determination. For example, the bundle management component 140 may determine that the first user might be interested in channel D (e.g., by determining that channel B is associated with one or more attributes preferred by the first user) and may reconfigure the subscription bundle by replacing channel A with channel D.

In some embodiments, the bundle management component 140 may dynamically reconfigure the first subscription bundle based on one or more user requests received within the subscription term. The user requests may be transmitted from the user app 111 in some embodiments. For example, the subscription management component 140 may receive a user request for replacing one or more first subscription services with one or more second subscription services (e.g., replacing channel A with channel D) within the subscription term. The subscription management component 140 can then reconfigure the first subscription bundle based on the user request. As another example, the bundle management component 140 may receive a user request for unsubscribing from one or more of the first subscription services within the subscription term. The bundle management component 140 may identify one or more second subscription services to replace the one or more first subscription services. More particularly, for example, the bundle management component 140 may receive a request for unsubscribing from channel A. The bundle management component 140 may determine that channel D and channel A share common attributes and may then modify the subscription bundle by replacing channel A with channel D.

In some embodiments, one or more of the subscription services may be associated with one or more parameters that define subscription limits, such as a minimum subscription term that defines the minimum time period during which a user is to be subscribed to the subscription service, a threshold number of times a user can unsubscribe from a given subscription service during the subscription term, etc. For example, channel A may be associated with a minimum subscription term of two weeks and cannot be unsubscribed during the minimum subscription term. Upon receiving a user request for modifying the first subscription bundle by replacing channel A with another television program, the bundle management component 140 may determine whether the first user has subscribed to channel A for the minimum subscription term. In response to determining that the first user has subscribed to channel A for the minimum subscription term (e.g., by determining that the first user has subscribed to channel A for two or more weeks), the bundle management component 140 may modify the first subscription bundle based on the user request.

Alternatively, in response to determining that the first user has not subscripted to channel A for the minimum subscription term, the bundle management component 140 may generate a message indicating the determination. The bundle management component 140 may generate data for presenting the message and may send the data to the user app 111. The subscription management component 105 may then present the message using the data received from the bundle management component 140. The bundle management component 140 may also prompt the first user to select one or more other subscription services to reconfigure the subscription bundle. For example, the bundle management component 140 may provide data for presenting one or more candidate subscription services that may be added to the first subscription bundle (e.g., data for presenting user interfaces including information about the candidate subscription services). The subscription management component 105 may present the data and may receive a user selection of one or more of the candidate subscription services. The selected candidate subscription services may then be added to the first subscription bundle.

The bundle management component 140 may generate payment information for the first subscription bundle and may send payments to the services providers 120A-120Z that provide the first subscription services and the second subscription services accordingly. In some embodiments, the payment information may be generated based on the consumption of each of the first and second subscription services by the first user within the subscription term. The consumption of a given subscription service by the first user may be measured by the time period during which the first user subscribes to the given subscription service, the time period during which the first user consumed content provided by the subscription service, etc. Accordingly, the bundle management component 140 may provide micropayments resulting from more fine-grain consumption of the subscription services.

Figure 2:
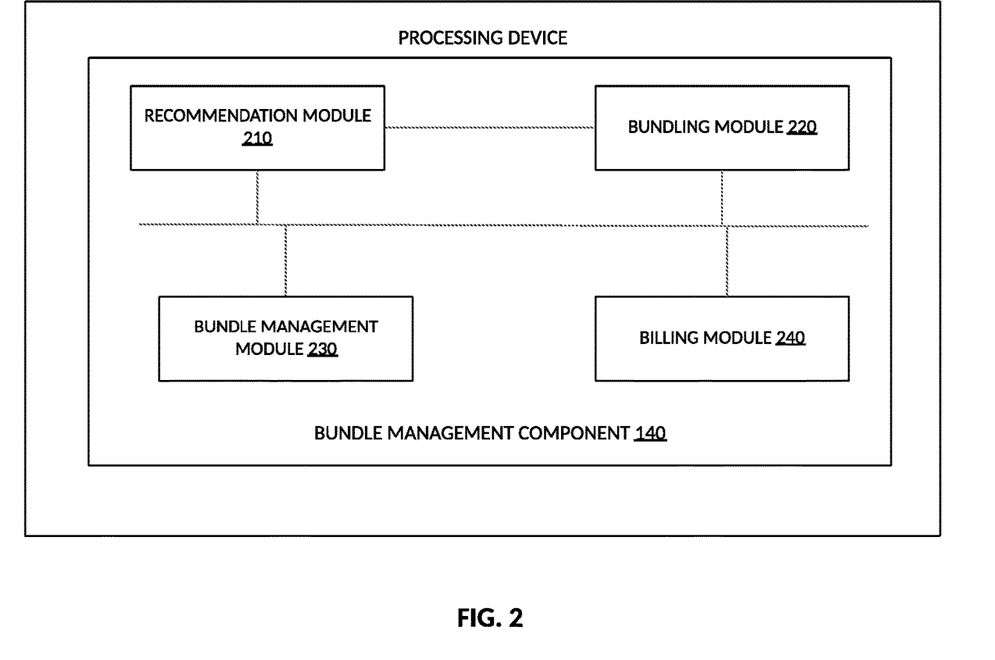
FIG. 2 is a block diagram illustrating an example of a server-side bundle management component in accordance with some embodiments of the disclosure.

FIG. 2 is a block diagram illustrating a server-side bundle management component 140 in accordance with some embodiments of the disclosure. In one implementation, the server-side bundle management component 140 is the same as its counterpart described with respect to FIG. 1. Server-side management component 140 may include a recommendation module 210, a bundling module 220, a bundle management module 230, and a billing module 240. More or fewer components may be included in the server-side management component 140 without loss of generality. For example, two of the modules may be combined into a single module, or one of the modules may be divided into two or more modules.

The recommendation module 210 may identify subscription services for one or more users. For example, the recommendation module 210 may identify one or more candidate subscription services that provide content, products, services, etc. in which a first user might be interested. In some embodiments, the recommendation module 210 may identify attributes associated with subscription services related to the first user (also referred to as the "first attributes"). The recommendation module 210 may then identify the candidate subscription services by determining that attributes associated with the candidate subscription services (also referred to as the "second attributes") match the first attributes. As referred to herein, attributes of a subscription service may include, for example, a genre of content provided by the subscription services related to the first user (e.g., "news," "sports," "drama," "music," "comedy"), a description of the content provided by the subscription services related to the first user, a provider of the subscription services, etc. The subscription services related to the first user may include one or more subscription services to which the first user has subscribed, one or more subscription services to which a user related to the first user has subscribed, one or more subscription services identified by the first user as subscription services that might interest the first user, etc.

The recommendation module 210 may obtain the first attributes associated with the subscription services related to the first user in any suitable manner. For example, the recommendation module 210 may obtain the first attributes by receiving one or more user inputs provided by the first user. As another example, the recommendation module 210 may obtain the first attributes by determining attributes associated with content, products, services, etc. related to the first user (e.g., content items with which the first user has interacted, products and/or services that have been purchased by the first user). As still another example, recommendation module 210 may obtain the first attributes by determining attributes of content, products, and/or services related to a second user (e.g., content with which the second user has interacted, products and/or services that have been purchased by the second user). The second user may be a user related to the first user in any suitable manner, such as a social contact of the first user, a user that shares one or more common interests with the first user, etc. Examples of a social contact of the first user include a "friend," a "follower," a "subscriber," a "connection," a "contact," and/or any other user that is connected to the user via a content sharing platform, a social network platform, an email service, a phone service, and/or any other platform or service.

The bundling module 220 may generate subscription bundles of subscription services. For example, the bundling module 220 may provide information of a plurality of bundle options to the first user and prompt the first user to select a bundle option (e.g., by providing data for presenting the information to a client device). Each of the bundle options may correspond to a certain number of subscription services to be associated with the subscription bundle, a subscription term, one or more types of subscription services (e.g., products, services, content), etc.

The bundling module 220 may generate a first subscription bundle based on a bundle option selected by the first user. For example, the bundling module 220 may identify the number of the subscription services to be included in the subscription bundle, the type(s) of the subscription services to be included in the subscription bundle, the subscription term associated with the subscription bundle, etc. The bundling module 220 may then identify one or more first subscription services to be included in the first bundle subscription accordingly. In some embodiments, the first subscription services may include one or more of the candidate subscription services identified by the recommendation module 210. For example, the recommendation module 210 may provide information about the candidate subscription services to the first user and may prompt the first user to select one or more of the candidate subscription services. The bundling module 220 may then identify the selected candidate subscription services as being the first subscription services.

In some embodiments, generating the first subscription bundle may include associating data about the first subscription services with the first subscription bundle (e.g., by storing the data in association with an identifier of the first subscription bundle). The data about the first subscription services may include, for example, identifiers of the first subscription services, information about content, products, services, etc. provided by the first subscription services, license information related to the first subscription services, etc. Generating the first subscription bundle may further include associating a subscription term with the first subscription bundle (e.g., by storing the subscription term with the identifier of the first subscription bundle). Generating the first subscription bundle may further include granting a user account of the first user access to content, products, services, etc. provided by the first subscription services.

The bundle reconfiguration module 230 may manage the subscription bundles generated by the bundling module 220 in a dynamic manner. For example, the bundle reconfiguration module 230 may detect interactions with the one or more first subscription services by the first user. The interactions may be detected periodically within the subscription bundle in some embodiments. The bundle reconfiguration module 230 may modify the first subscription bundle during the subscription term according to the detected user interactions. In some embodiments, the bundle reconfiguration module 230 may further determine whether the detected interactions satisfy one or more predetermined computer-implemented rules. The computer-implemented rules may include, for example, a first rule specifying threshold user interactions required for a subscription service (e.g., a threshold number of user interactions, consuming the subscription service for at least a predetermined period of time), a second rule specifying a threshold rating of the subscription service, etc.

In some embodiments, the bundle reconfiguration module 230 may modify the first subscription bundle in response to determining that the first user's interactions with a first subscription service does not satisfy the one or more computer-implemented rules (e.g., by determining that the first user has not consumed content related to the first subscription service for a predetermined period of time or that a rating of the first subscription service provided by the first user is lower than a threshold rating). To modify the first subscription bundle, the bundle reconfiguration module 230 may disassociate the first subscription service with the first subscription bundle and may associate a second subscription service with the first subscription bundle (e.g., by storing information about the second subscription service with the identifier of the first subscription bundle).

In some embodiments, the bundle reconfiguration module 230 may dynamically modify the first subscription bundle based on one or more user requests received within the subscription term (e.g., a user request for replacing one or more of the first subscription services with one or more second subscription services, a user request to unsubscribe from the first subscription service within the subscription term). The subscription management component 105 can then modify the first subscription bundle based on the user request.

The billing module 240 may generate payment information related to subscription bundles. For example, the billing module 240 may generate payment information for the first subscription bundle based on the consumption of each of the first and second subscription services by the first user within the subscription term. The billing module 240 may also direct payment to each of the first subscription services and the second subscription services accordingly. To determine the consumption of a given subscription service by the first user, the billing module 240 may determine the time period during which the first user subscribes to the given subscription service, the time period during which the first user consumed content provided by the subscription service, etc.

Figure 3:
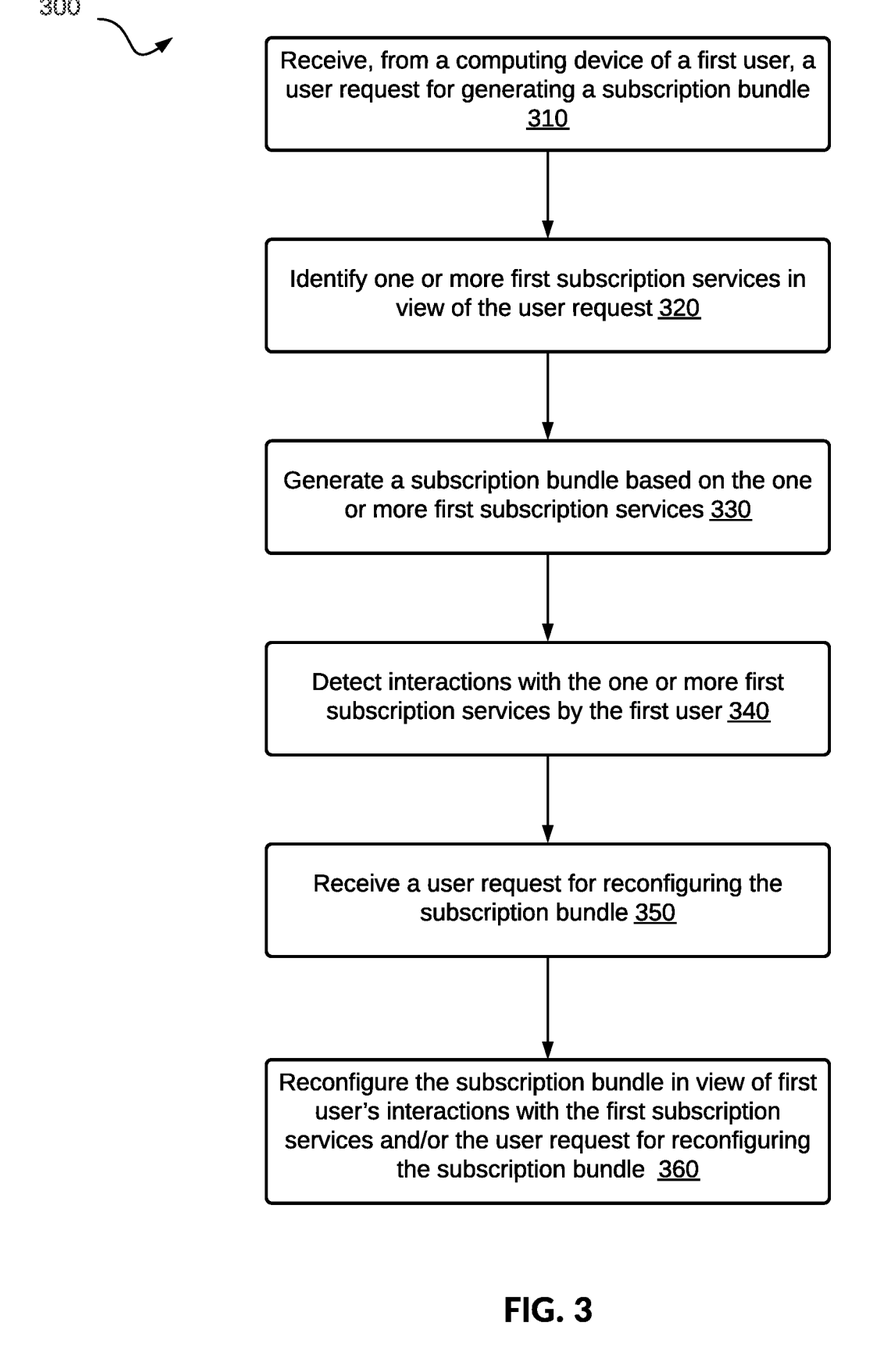
FIGS. 3 and 4 are flow diagrams illustrating example methods for dynamic bundling according to some implementations of the disclosure.
Figure 4:
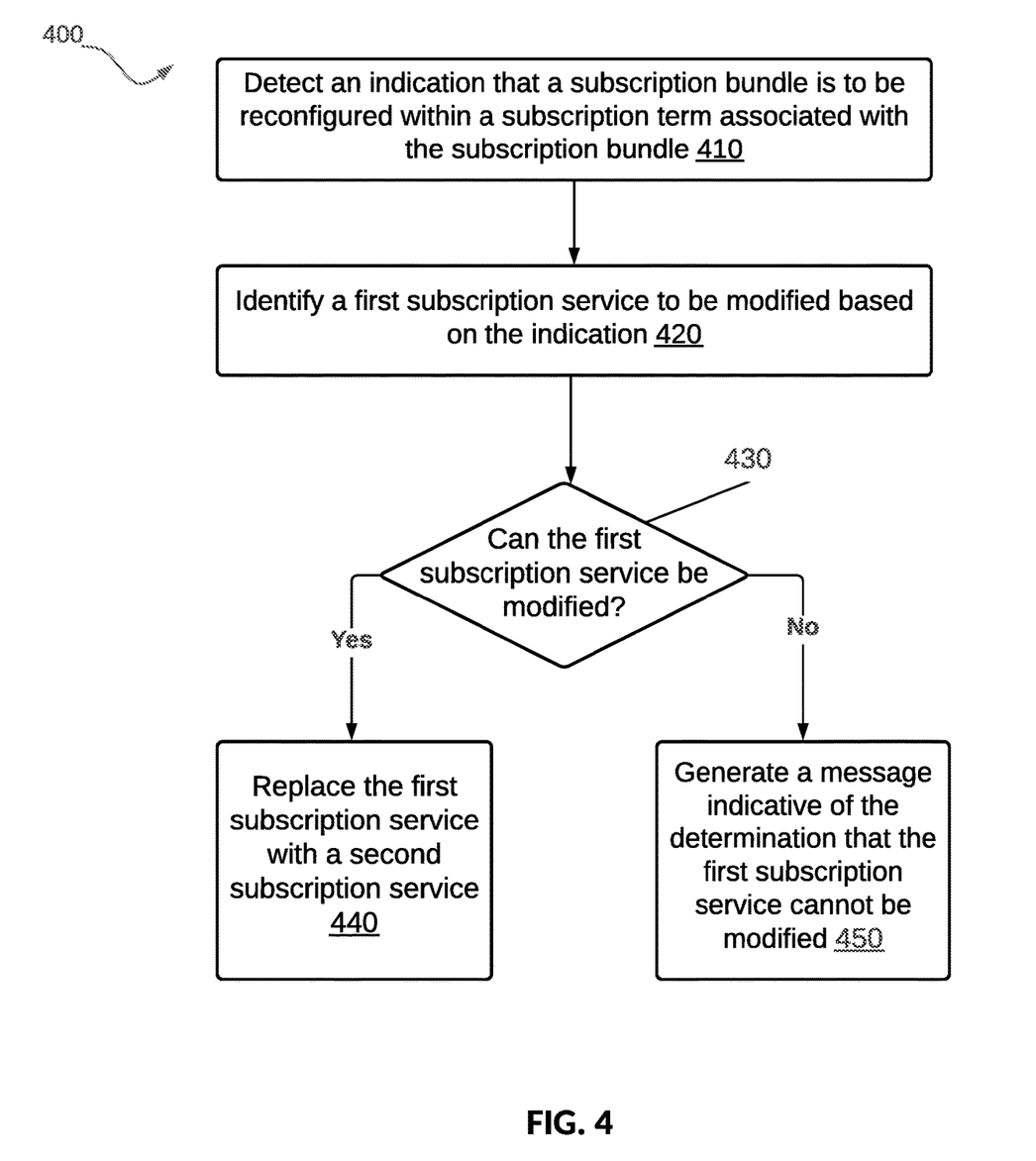

FIGS. 3 and 4 are flow diagrams illustrating methods 300 and 400 for dynamic bundling according to some implementations of the disclosure. The method 300 may be performed by processing logic that comprises hardware (e.g., circuitry, dedicated logic, programmable logic, microcode, etc.), software (e.g., instructions run on a processing device to perform hardware simulation), or a combination thereof.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, methods 300 and 400 may be performed by a processing device executing the bundle management component 140 as shown in FIGS. 1 and 2.

Method 300 may begin at block 310 when the processing device receives, from a computing device of a first user, a user request for generating a subscription bundle. The user request may further include information about one or more subscription services to be associated with the subscription bundle. For example, the user request may include information about one or more types of subscription services to be associated with the subscription bundle, such as "media streaming service," "television service," "news," "magazines," "books," "audio books," "clothing subscription," "toys subscription," "crafts subscription," "newsletters," "games," "mobile apps," etc. As another example, the user request may include the number of subscription services to be associated with the subscription bundle. As a further example, the user preference may include one or more attributes of subscription services in which the user might be interested. In some embodiments, one or more of the attributes of the subscription service may be provided by one or more user inputs.

In some embodiments, the user request may include a subscription option selected by the first user. The selected subscription option may correspond to a certain number of subscription services to be associated with the subscription bundle, a subscription term, one or more types of subscription services, etc. In some embodiments, the user request may include an identifier that identifies the selected subscription option. The processing device may retrieve the information about the subscription bundle using the identifier.

At block 320, the processing device can identify one or more first subscription services in view of the user request. For example, the processing device may identify one or more subscription services based on the information of the subscription services included in the user request, such as the number of subscription services to be associated with the subscription bundle, the types of subscription services, etc. The processing device may further identify the one or more first subscription services by identifying one or more subscription services associated with the attributes of subscription services in which the first user might be interested.

In some embodiments, the processing device may identify one or more candidate subscription services in view of the user request, as described above. The processing device may then provide information about the candidate subscription services to the user (e.g., by providing data for presenting the information to a computing device of the user). The processing device may further receive a user selection of one or more of the candidate subscription services and may identify the selected candidate subscription services as the first subscription services.

At block 330, the processing device may generate a subscription bundle based on the one or more first subscription services. The subscription bundle may be associated with a subscription term (e.g., a month, a year). Generating the subscription bundle may include storing data about the one or more first subscription services (e.g., identifiers of the first subscription services, license information of the first subscription services), the subscription term, and/or any other information related to the one or more subscription services in association with an identifier of a user account of the user. Generating the subscription bundle may further include granting a user account of the first user access to the first subscription services.

At block 340, the processing device may detect interactions with the one or more first subscription services by the first user. Examples of interactions with a subscription service may include consumption of content related to the subscription service, sharing the content related to the subscription service on a content sharing platform, providing a comment in association with the subscription service on a social network, liking the subscription service and/or content associated with the subscription service, purchasing products and/or services provided by the subscription service, etc.

At block 350, the processing device may receive a user request for reconfiguring the subscription bundle. For example, the received user request may include a request for unsubscribing from one or more of the first subscription services. As another example, the received user request may include a request for adding one or more subscription services to the subscription bundle.

At block 360, the processing device may reconfigure the subscription bundle in view of the first user's interactions with the first subscription services and/or the user request for reconfiguring the subscription bundle. For example, the processing device may disassociate one or more of the first subscription services from the subscription bundle and may associate one or more second subscription services with the bundle service. The reconfiguration may be performed within the subscription term associated with the subscription bundle. In some embodiments, the processing device may perform one or more operations depicted in connection with FIG. 4 to reconfigure the subscription bundle.

Method 400 may begin at block 410 when the processing device detects an indication that a subscription bundle is to be reconfigured within a subscription term associated with the subscription bundle. For example, the indication may be detected by receiving a user request for unsubscribing from one or more subscription services included in the subscription bundle within the subscription term. As another example, the indication may be detected by detecting interactions with the subscription services included in the bundle service by a user associated with the subscription bundle and determining that the interactions do not satisfy one or more predetermined computer-implemented rules.

At block 420, the processing device can identify a first subscription service to be modified based on the indication. For example, the processing device may identify the first subscription service based on a user request for unsubscribing from the first subscription service received at 410. As another example, the processing device may identify the first subscription service based on a determination that the user's interactions with the first subscription service fail to satisfy one or more predetermined computer-implemented rules.

At block 430, the processing device can determine whether the first subscription service can be modified. The determination can be made, for example, by determining whether one or more subscription limits applicable to the first subscription are satisfied. The subscription limits may be defined using one or more parameters, such as a minimum subscription period that defines the minimum time period during which a user is to be subscribed to the subscription service, a threshold number of times a given subscription service may be unsubscribed during the subscription term, etc.

Figure 5:
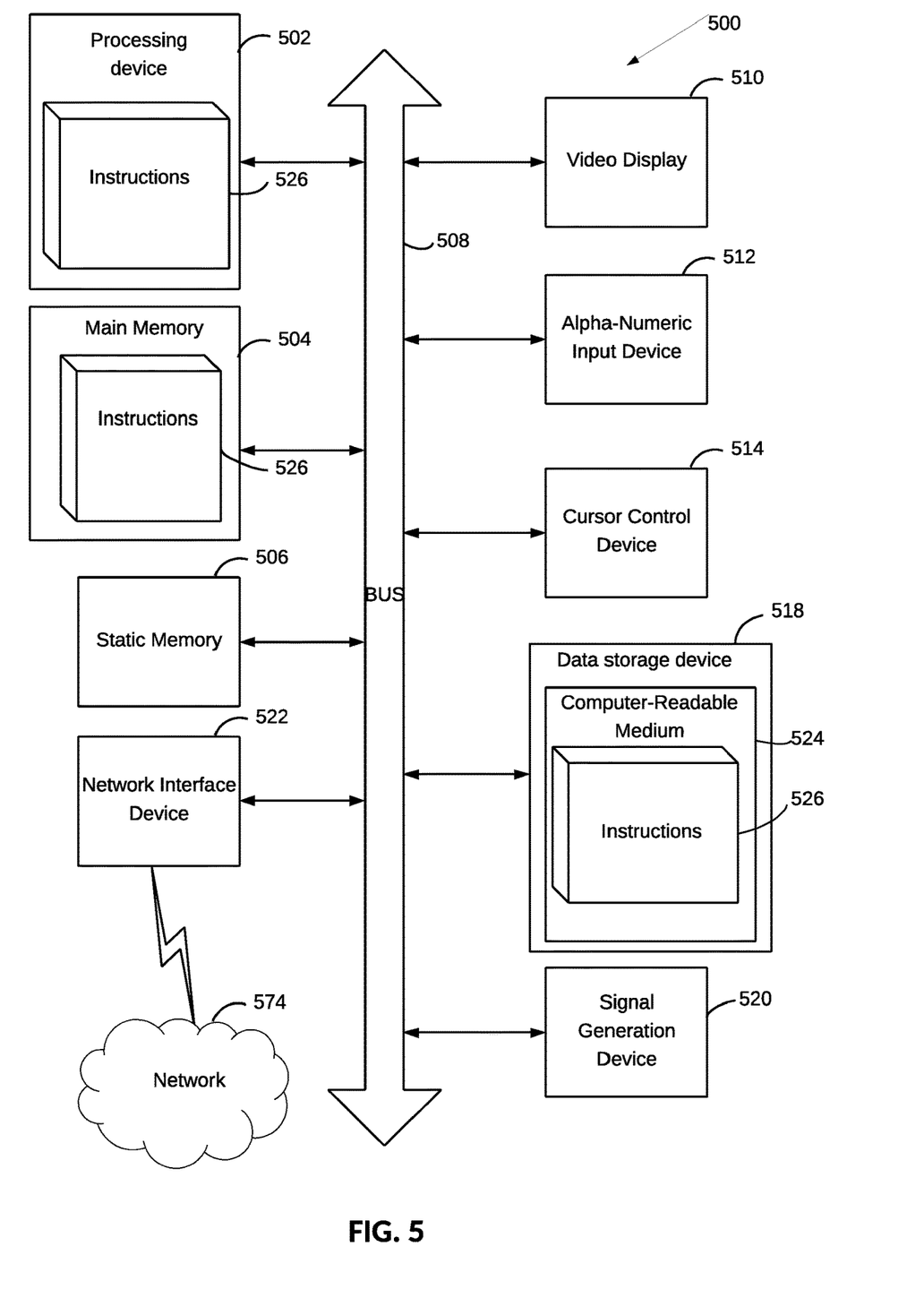
FIG. 5 illustrates an example of a system architecture for providing dynamic bundling in accordance with the embodiments of the present disclosure

FIG. 5 illustrates a diagrammatic representation of a machine in the exemplary form of a computer system 500 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device (processor) 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 508.

Processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 502 may also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein.

The computer system 500 may further include a network interface device 522. The computer system 500 also may include a video display unit 810 (e.g., a liquid crystal display (LCD), a cathode ray tube (CRT), or a touch screen), an alphanumeric input device 512 (e.g., a keyboard), a cursor control device 814 (e.g., a mouse), and a signal generation device 520 (e.g., a speaker).

The data storage device 518 may include a computer-readable storage medium 524 on which is stored one or more sets of instructions 526 (e.g., software) embodying any one or more of the methodologies or functions described herein. The instructions 526 may also reside, completely or at least partially, within the main memory 504 and/or within the processing device 502 during execution thereof by the computer system 500, the main memory 504 and the processing device 502 also constituting computer-readable storage media. The instructions 526 may further be transmitted or received over a network 574 via the network interface device 522.

In one embodiment, the instructions 526 include instructions for the bundle management component 140 described with respect to FIGS. 1 and 2, and/or a software library containing methods that may dynamically reconfigure the subscription bundle. While the computer-readable storage medium 524 is shown in an exemplary implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

The processing device may perform one or more operations based on the determination. In response to determining that the first subscription service can be modified, the processing device may reconfigure the bundle subscription by replacing the first subscription service with a second subscription service. For example, the processing device may disassociate the first subscription service from the subscription bundle and may associate the second subscription service with the subscription bundle (e.g., by storing data about the second subscription service in association with an identifier of the subscription bundle). The processing device may also grant the user access to the second subscription service. In some embodiments, the second subscription service may be identified by the user. In some embodiments, the second subscription service may be identified by the processing device (e.g., by the recommendation module 210 of FIG. 2).

In some embodiments, the processing device may proceed to block 450 in response to determining that the first subscription service cannot be modified (e.g., by determining that the user has not subscribed to the first subscription service for the minimum subscription term). At block 450, the processing device may generate a message indicative of the determination that the first subscription service cannot be modified. The processing device may further provide information about one or more candidate subscription services that may be used to reconfigure the subscription bundle. For example, the processing device may provide a user device of the user with data for presenting the information about the candidate subscription services via one or more user interfaces.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "analyzing," "determining," "enabling," "identifying," "modifying," "configuring," "reconfiguring," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

The terms "approximately," "about," and "substantially" may be used to mean within ±20% of a target dimension in some embodiments, within ±10% of a target dimension in some embodiments, within ±5% of a target dimension in some embodiments, and yet within ±2% in some embodiments. The terms "approximately" and "about" may include the target dimension.

The terms "first," "second," "third," "fourth," etc. as used herein are meant as labels to distinguish among different elements and may not necessarily have an ordinal meaning according to their numerical designation.

Whereas many alterations and modifications of the disclosure will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the disclosure.

What is claimed is:

1. A method, comprising:
 receiving, from a computing device of a first user, a user request for generating a subscription bundle;
 identifying, by a processing device, one or more first subscription services in view of the user request;
 generating, by the processing device, the subscription bundle based on the one or more first subscription services;
 detecting, by the processing device, interactions with the one or more first subscription services by the first user;
 reconfiguring, by the processing device, the subscription bundle based in view of the interactions with the first subscription services by the first user, wherein the one or more first subscription services are replaced with one or more second subscription services by a bundle management component connected with the processing device to reconfigure the subscription bundle; and generating, by the bundle management component, payment information for the subscription bundle and sending payments to a plurality of services providers that provide the one or more first subscription services and the one or more second subscription services.

2. The method of claim 1, further comprising:

reconfiguring the subscription bundle in view of a user request for reconfiguring the subscription bundle, wherein the user request for reconfiguring the subscription bundle comprises at least one of a request for unsubscribing from one or more of the first subscription services or a request for adding one or more subscription services to the subscription bundle.

3. The method of claim 2, wherein the user request for generating the subscription bundle comprises information about one or more subscription services to be associated with the subscription bundle.

4. The method of claim 3, wherein the information about one or more subscription services comprises one or more types of subscription services to be associated with the subscription bundle.

5. The method of claim 1, wherein the user request for generating the subscription bundle comprises the number of subscription services to be associated with the subscription bundle.

6. The method of claim 1, wherein the user request for generating the subscription bundle comprises one or more attributes of subscription services in which the first user is interested, and wherein identifying one or more first subscription services in view of the user request is based on one or more attributes of subscription services in which the first user is interested.

7. The method of claim 1, wherein generating the subscription bundle based on the one or more first subscription services comprises:

storing at least one of data about the one or more first subscription services, a subscription term, or information related to the one or more first subscription services in association with an identifier of a user account of the first user.

8. The method of claim 1, wherein reconfiguring the subscription bundle comprises disassociating one or more of the first subscription services from the subscription bundle and associating the one or more second subscription services with the subscription bundle.

9. The method of claim 1, further comprising:

detecting an indication that the subscription bundle is to be reconfigured within a subscription term associated with the subscription bundle;

identifying a first subscription service to be modified based on the indication;

determining whether the first subscription service can be modified; and performing an operation based on the determination, wherein the operation comprises at least one of:

replacing the first subscription service with a second subscription service in response to determining that the first subscription service can be modified; or generating a message indicative of the determination that the first subscription service cannot be modified in response to determining that the first subscription service cannot be modified.

10. The method of claim 9, wherein detecting the indication comprises receiving a user request for unsubscribing from one or more subscription services included in the subscription bundle within the subscription term.

11. The method of claim 9, wherein detecting the indication comprises detecting interactions with the first subscription services included in the subscription bundle by the first user and determining that the interactions do not satisfy one or more predetermined computer-implemented rules.

12. The method of claim 9, wherein determining whether the first subscription service can be modified comprises:

determining whether one or more subscription limits applicable to the first subscription services are satisfied.

13. The method of claim 12, wherein the one or more subscription limits comprise at least one of a minimum subscription period that defines the minimum time period during which a user is to be subscribed to the subscription service, a threshold number of times a given subscription service may be unsubscribed during the subscription term.

14. The method of claim 12, wherein replacing the first subscription service with a second subscription service comprises:

disassociating the first subscription service from the subscription bundle and associating the second subscription service with the subscription bundle.

15. The method of claim 14, wherein replacing the first subscription service with a second subscription service further comprises:

granting user access to the second subscription service.

16. The method of claim 12, further comprises:

providing a user device of the first user with data for presenting information about candidate subscription services via one or more user interfaces, wherein the candidate subscription services relate to a second user.

17. A system, comprising:

a memory; and a processing device communicably coupled to the memory, the processing device to execute instructions to:

receive, from a computing device of a first user, a user request for generating a subscription bundle;

identify one or more first subscription services in view of the user request;

generate the subscription bundle based on the one or more first subscription services;

detect interactions with the one or more first subscription services by the first user;

reconfigure the subscription bundle based in view of the interactions with the first subscription services by the first user, wherein the one or more first subscription services are replaced with one or more second subscription services by a bundle management component connected with the processing device to reconfigure the subscription bundle; and generate, by the bundle management component, payment information for the subscription bundle and sending payments to a plurality of services providers that provide the one or more first subscription services and the one or more second subscription services.

18. The system of claim 17, wherein the processing device is further to:

reconfigure the subscription bundle in view of a user request for reconfiguring the subscription bundle, wherein the user request for reconfiguring the subscription bundle comprises at least one of a request for unsubscribing from one or more of the first subscription services or a request for adding one or more subscription services to the subscription bundle.

19. The system of claim 17, wherein the processing device is further to:
   detect an indication that the subscription bundle is to be reconfigured within a subscription term associated with the subscription bundle;
   identify a first subscription service to be modified based on the indication;
   determine whether the first subscription service can be modified; and
   perform an operation based on the determination, wherein the operation comprises at least one of:
      replacing the first subscription service with a second subscription service in response to determining that the first subscription service can be modified; or
      generating a message indicative of the determination that the first subscription service cannot be modified in response to determining that the first subscription service cannot be modified.

20. A non-transitory machine-readable storage medium storing instructions which, when executed, cause a processing device to:
   receive, from a computing device of a first user, a user request for generating a subscription bundle;
   identify one or more first subscription services in view of the user request;
   generate the subscription bundle based on the one or more first subscription services;
   detect interactions with the one or more first subscription services by the first user;
   reconfigure the subscription bundle based in view of the interactions with the first subscription services by the first user, wherein the one or more first subscription services are replaced with one or more second subscription services by a bundle management component connected with the processing device to reconfigure the subscription bundle; and
   generate, by the bundle management component, payment information for the subscription bundle and sending payments to a plurality of services providers that provide the one or more first subscription services and the one or more second subscription services.

\* \* \* \* \*